US012157098B2

(12) United States Patent
Kessler et al.

(10) Patent No.: US 12,157,098 B2
(45) Date of Patent: Dec. 3, 2024

(54) RESONANT ACOUSTIC MIXING SYSTEM AND METHOD

(71) Applicant: Honeywell Federal Manufacturing & Technologies, LLC, Kansas City, MO (US)

(72) Inventors: Daniel S. Kessler, Stilwell, KS (US); Troy W. Leonard, Lee's Summit, MO (US)

(73) Assignee: Honeywell Federal Manufacturing & Technologies, LLC, Kansas, MO (US)

( * ) Notice: Subject to any disclaimer, the term of this patent is extended or adjusted under 35 U.S.C. 154(b) by 122 days.

(21) Appl. No.: 17/549,972

(22) Filed: Dec. 14, 2021

(65) Prior Publication Data

US 2023/0182094 A1 Jun. 15, 2023

(51) Int. Cl.

*B01F 31/50* (2022.01)
*B01F 35/42* (2022.01)
*B05C 3/05* (2006.01)
*B05D 1/42* (2006.01)

(52) U.S. Cl.

CPC ............ *B01F 31/50* (2022.01); *B01F 35/422* (2022.01); *B05C 3/05* (2013.01); *B05D 1/42* (2013.01)

(58) Field of Classification Search

CPC ........ B01F 31/50; B01F 35/422; B01F 35/45; B01F 35/451; B01F 31/25; B01F 33/35; B01F 35/40; B01F 35/42

See application file for complete search history.

(56) References Cited

U.S. PATENT DOCUMENTS 4,523,855 A * 6/1985 Walker .................. B01F 35/422 366/237
4,619,532 A * 10/1986 Schmidt, III ......... B01F 31/265 D15/147
6,308,704 B1 * 10/2001 Wennerberg ............ B01F 25/84 128/203.15
6,334,583 B1 * 1/2002 Li ........................... B02C 17/08 977/777
7,270,472 B2 9/2007 Carreras
(Continued)

FOREIGN PATENT DOCUMENTS

CN 206114246 U * 4/2017
CN 207769670 U * 8/2018
(Continued)

OTHER PUBLICATIONS

Davey, R. J., Wilgeroth, J. M., & Bore, A. O. (2019). Processing studies of energetic materials using resonant acoustic mixing technology. Propellants Explosives Pyrotechnics, 45, 1-10. (Year: 2019).*
(Continued)

*Primary Examiner* — Marc C Howell
*Assistant Examiner* — Patrick M McCarty
(74) *Attorney, Agent, or Firm* — Hovey Williams LLP

(57) ABSTRACT

A method for mixing, milling, and coating a plurality of constituents comprises placing the constituents in a container that includes a cylindrical inner surface; applying a first vibration to the container such that a motion of the vibration is parallel to a longitudinal axis of the container; and applying a second vibration to the container such that the motion of the vibration is not parallel to the longitudinal axis of the container.

10 Claims, 4 Drawing Sheets

(56) References Cited

U.S. PATENT DOCUMENTS

| | | | | |
|---|---|---|---|---|
| 7,866,878 | B2 | 1/2011 | Howe et al. | |
| 8,016,218 | B1 * | 9/2011 | Friedman | B01F 31/23 366/110 |
| 8,593,634 | B1 * | 11/2013 | Igarashi | B01F 33/844 356/402 |
| 8,905,624 | B1 * | 12/2014 | Howe | B01F 31/89 366/115 |
| 9,339,779 | B1 * | 5/2016 | Olson | B01F 31/265 |
| 10,335,749 | B2 | 7/2019 | Lucon et al. | |
| 2005/0152216 | A1 * | 7/2005 | Friedman | B01F 31/27 366/208 |
| 2006/0256643 | A1 * | 11/2006 | Lee | B01F 31/22 366/208 |
| 2012/0289623 | A1 * | 11/2012 | Sumiyoshi | B29B 7/08 523/351 |
| 2013/0255190 | A1 * | 10/2013 | Faucher | G03G 15/0867 53/428 |
| 2014/0016431 | A1 * | 1/2014 | Takenaka | B01F 31/24 366/108 |
| 2014/0226430 | A1 * | 8/2014 | Bloch | H01M 10/44 366/111 |
| 2015/0080567 | A1 | 3/2015 | Salan et al. | |
| 2015/0255779 | A1 * | 9/2015 | Hong | H01M 4/045 264/484 |
| 2017/0216793 | A1 * | 8/2017 | Bloch | B01F 31/87 |
| 2017/0281530 | A1 * | 10/2017 | Bennett | B01F 31/86 |
| 2019/0017908 | A1 | 1/2019 | Pettis et al. | |
| 2019/0126439 | A1 * | 5/2019 | Molburg | B25B 1/20 |

FOREIGN PATENT DOCUMENTS

| | | | | | |
|---|---|---|---|---|---|
| CN | 212189374 | U | * | 12/2020 | |
| DE | 202019104121 | U1 | * | 9/2019 | |
| JP | 2001232170 | A | * | 8/2001 | |
| WO | WO-2013144655 | A1 | * | 10/2013 | A61J 3/02 |
| WO | WO2019/102345 | | | 5/2019 | |

OTHER PUBLICATIONS

Hope, K. S., Lloyd, H. J., Ward, D., Michalchuk, A. A., & Pulham, C. R. (2015). Resonant acoustic mixing and its applications to energetic materials. New Trends in Research of Energetic Materials, 134-143. (Year: 2015).*

* cited by examiner

RESONANT ACOUSTIC MIXING SYSTEM AND METHOD

STATEMENT REGARDING FEDERALLY-SPONSORED RESEARCH OR DEVELOPMENT

This invention was made with Government support under Contract No.: DE-NA0002839 awarded by the United States Department of Energy/National Nuclear Security Administration. The Government has certain rights in the invention.

FIELD OF THE INVENTION

Embodiments of the current invention relate to systems and methods for improved resonant acoustic mixing.

DESCRIPTION OF THE RELATED ART

Resonant acoustic mixing involves applying a vibration to a container to induce reciprocating up and down motion on the contents of the container. The vibration may be applied with a relatively high acceleration and a relatively low amplitude. The frequency of the vibration is typically around 60 Hz. The container is often cylindrical shaped with a circumferential side wall and disc-shaped top and bottom walls. The force is applied along the longitudinal axis of the container.

SUMMARY OF THE INVENTION

Embodiments of the current invention provide a system and method that improve resonant acoustic mixing and provide milling and coating. The system and method comprise applying a first vibration to a container including a plurality of constituents. The first vibration is applied while the container is in an orientation with its longitudinal axis in a vertical direction. The system and method further comprise applying a second vibration to the container while the container is in an orientation with its longitudinal axis in a horizontal direction. During the second vibration, the constituents reflect off the curved surfaces of the interior of the container which provides targeted spherical coating of some constituents by other constituents not obtained by prior art systems.

An embodiment of the system broadly comprises a container, a clamp, and a vibration device. The container includes a cylindrical inner surface and is configured to receive and retain the constituents. The clamp is attached to an outer surface of the container and includes a plurality of outer surfaces with two outer surfaces on opposing sides that are parallel to one another. The vibration device is configured to apply one-dimensional vibration and retain opposing ends of the container during a first vibration and opposing sides of the clamp during a second vibration.

One embodiment of the method broadly comprises placing the constituents in a container that includes a cylindrical inner surface; applying a first vibration to the container such that a motion of the vibration is parallel to a longitudinal axis of the container; and applying a second vibration to the container such that the motion of the vibration is not parallel to the longitudinal axis of the container.

Another embodiment of the method comprises placing the constituents in a container that includes a cylindrical inner surface; applying a first vibration to the container such that a motion of the vibration is parallel to a longitudinal axis of the container and the container is oriented with the longitudinal axis being parallel to a vertical axis; and applying a second vibration to the container such that the motion of the vibration is transverse to the longitudinal axis of the container and the container is oriented with the longitudinal axis being parallel to a horizontal axis.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figure 1:
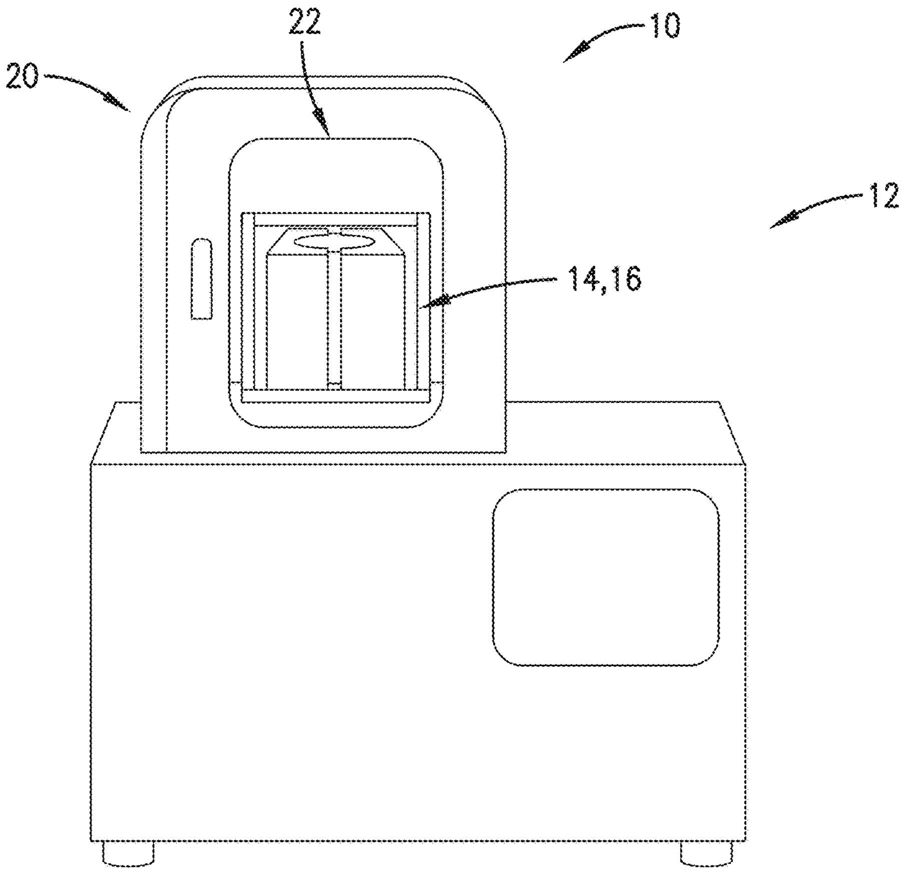
FIG. 1 is a front view of a system, constructed in accordance with various embodiments of the current invention, for mixing, milling, and coating, the system including a vibration device and a container.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

Relational and/or directional terms, such as "above", "below", "up", "upper", "upward", "down", "downward", "lower", "top", "bottom", "outer", "inner", etc., along with orientation terms, such as "horizontal" and "vertical", may be used throughout this description. These terms are used with reference to embodiments of the technology and the positions, directions, and orientations thereof shown in the accompanying figures. Embodiments of the technology may be positioned and oriented in other ways or move in other directions. Therefore, the terms do not limit the scope of the current technology.

A system 10, constructed in accordance with various embodiments of the current invention, for mixing, milling, and coating is shown in FIG. 1. The system 10 broadly comprises a vibration device 12 and a container 14. The system 10 may optionally include a clamp 16. The system 10 utilizes resonant acoustic mixing (RAM) techniques, such as low frequency vibration, or oscillation, and high acceleration, that are applied to the container 14 when the container 14 is in a first orientation and when the container 14 is in a second orientation. The system 10 provides mixing of a plurality of constituents 18, milling, e.g., using one or more constituents 18 to reduce or break down the size of one or more other constituents 18, and coating, e.g., the covering of one or more larger constituents 18 with one or more smaller constituents 18—wherein all three actions occur in the same single container 14.

Figure 3A:
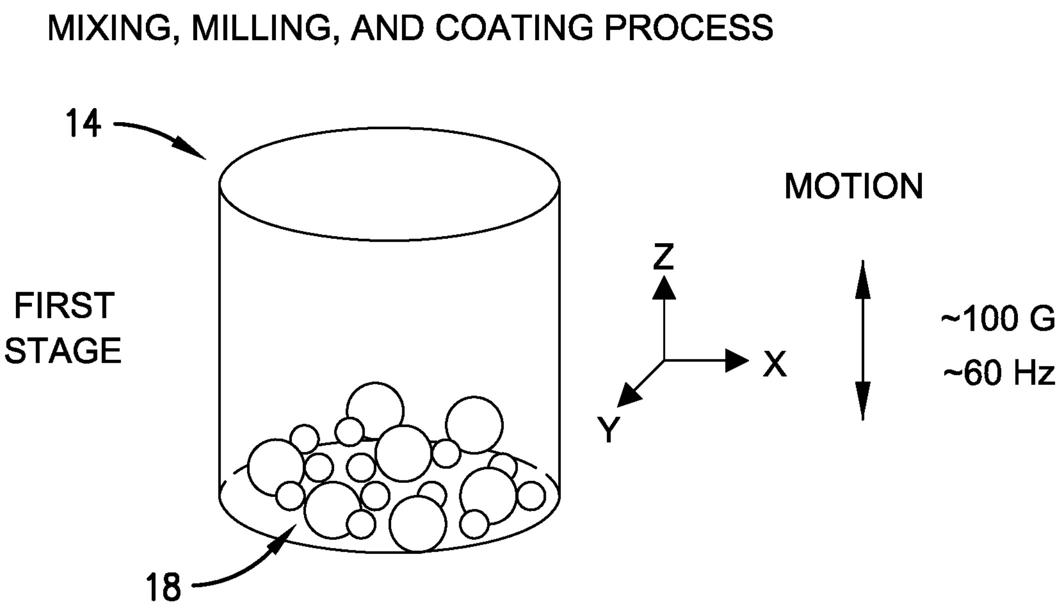
FIG. 3A is an illustration of a first stage of a mixing, milling, and coating process.
Figure 3B:
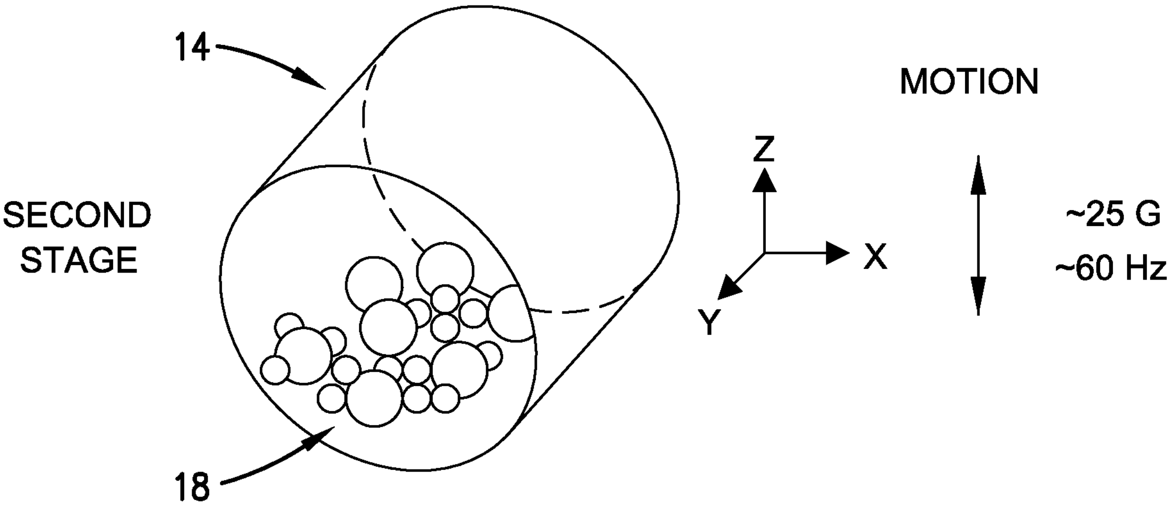
FIG. 3B is an illustration of a second stage of the mixing, milling, and coating process.

Each constituent 18 is a small object or particle and may have a regular shape, such as a spherical shape, a cubic shape, or a hexagonal shape, or an irregular shape. The constituents 18 may have a size ranging from a few microns to a few millimeters. Furthermore, the term "constituent" may refer to a group of objects or particles that have a common property, such as those that are formed from the same material or have roughly the same size. For example, a first constituent may be formed from a first material, and a second constituent may be formed from a second material. As shown in FIGS. 3A and 3B, a first constituent 18 may have a first size, and a second constituent may have a second size.

The vibration device 12 generally applies vibration to the container 14. As shown in FIG. 1, the vibration device 12 includes a housing 20 that encloses a chamber 22 in which the container 14 is placed for the milling, mixing, and coating process. The housing 20 may also include a door which provides access to the chamber 22. In addition, within the chamber 22, there is a retention apparatus which retains the container 14 and is coupled to motor drive components which generate the vibration. The retention apparatus may include braces, clamps, and other retention components that hold the container 14 at opposing ends while the vibration is applied. The vibration is generally limited to back and forth reciprocating motion in one dimension. For example, the vibration is generally limited to up and down motion in the vertical direction, or as indicated in FIG. 3A, up and down motion parallel to the Z axis (in an XYZ coordinate system). The vibration device 12 may further include a display with a touchscreen user interface.

The vibration device 12 provides vibration with an acceleration ranging from approximately 1 G (acceleration due to the gravitational force) to approximately 100 G, an amplitude up to approximately 0.55 inches, and a frequency of approximately 60 hertz (Hz).

In some embodiments, the vibration device 12, or the system 10 more broadly, may include a container reorientation apparatus (not shown in the figures) which may be positioned within the chamber 22 and couples or interacts with the container 14 to change its orientation during the mixing, milling, and coating process, as described in more detail below.

Figure 2A:
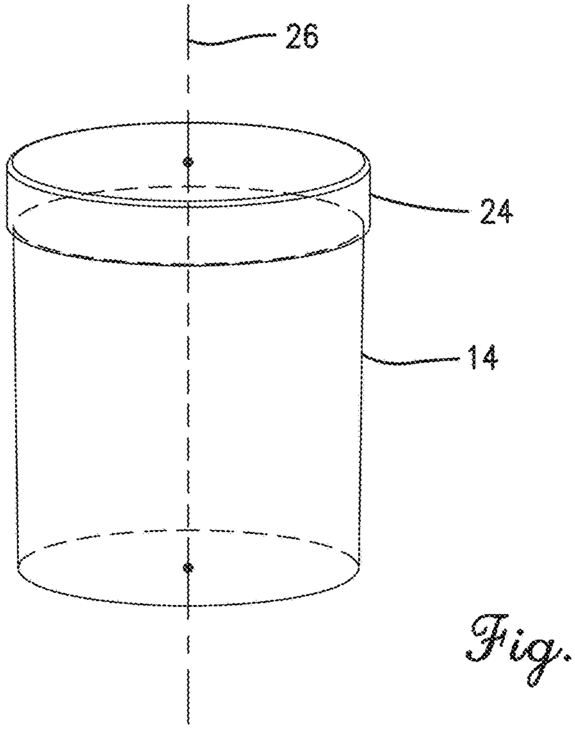
FIG. 2A is a front view of the container.

The container 14 generally retains the constituents 18 during the mixing, milling, and coating process. Referring to FIG. 2A, the container 14 may also include a lid 24. The container 14 has a cylindrical inner surface. The cylindrical inner surface typically has a circumferential side surface that forms an angle with a bottom surface of 90 degrees in order to minimize the interaction of the constituents 18 with the side surface of the interior of the container 14 during the first stage of the mixing, milling, and coating process discussed below. In some embodiments, such as those shown in the figures, the container 14 may have a cylindrical outer surface formed by a generally cylindrical circumferential side wall. In other embodiments, the container 14 may have a generally cubic or rectangular box outer surface. In all embodiments, the container 14 has a longitudinal axis 26. The container 14 may be formed from polymers or other rigid materials that can withstand the acceleration forces exerted by the vibration device 12. In some embodiments, the container 14 may have a relatively thin side wall. In other embodiments, the container 14 may have a relatively thicker side wall and/or may be formed from materials with greater strength or hardness properties. But, the weight of the container 14 may be a consideration when determining the total load for the vibration device 12.

Figure 2B:
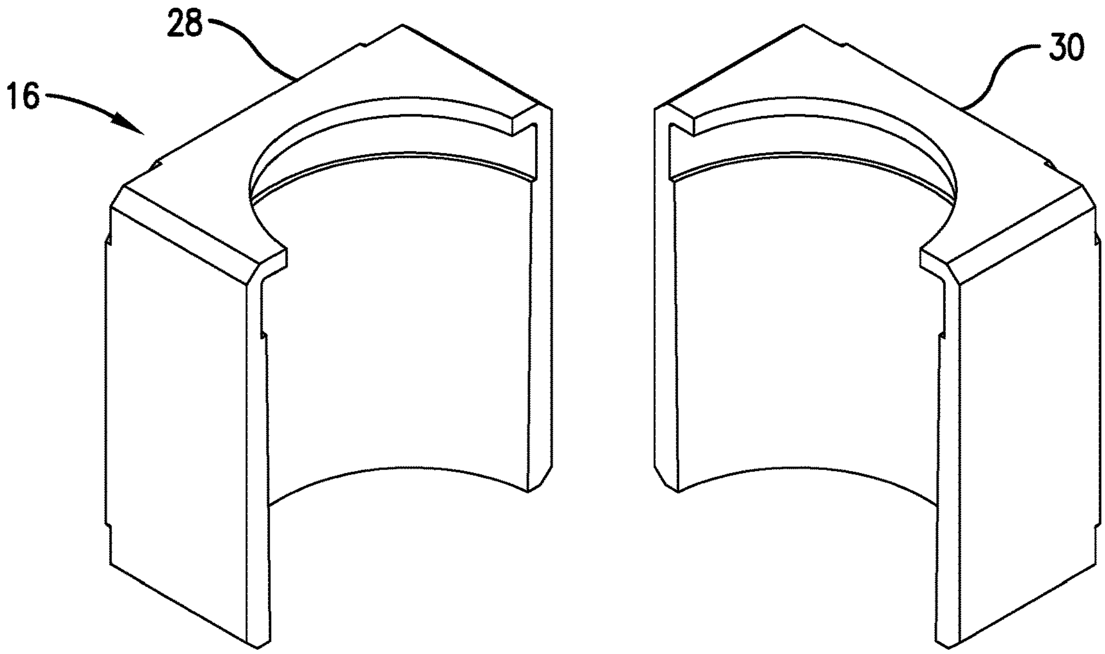
FIG. 2B is an upper perspective view of two separated halves of a clamp.
Figure 2C:
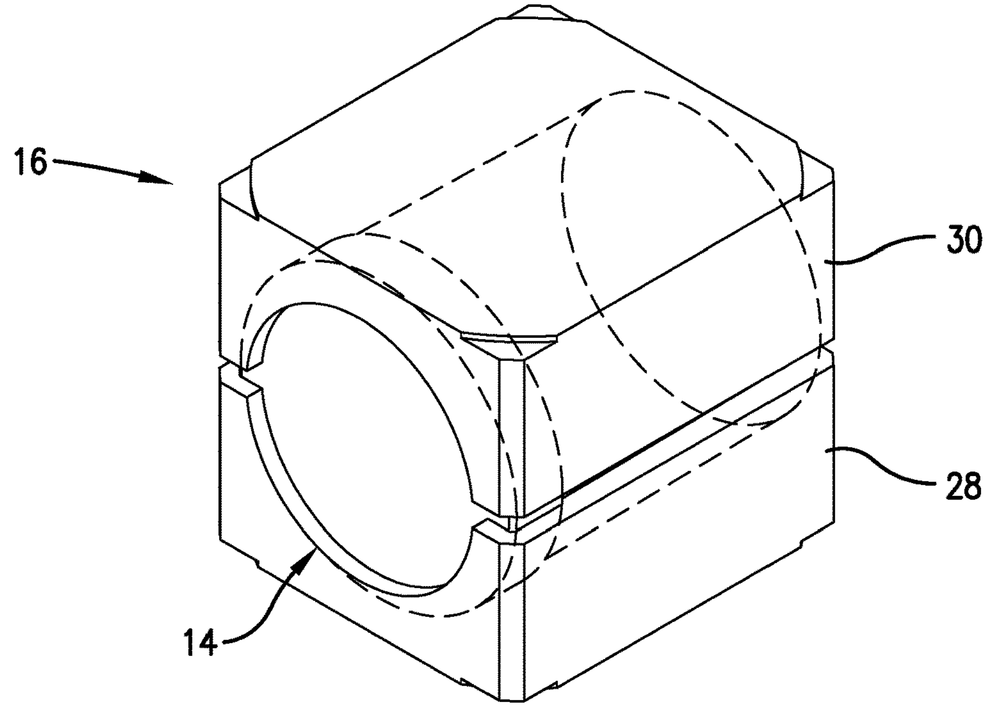
FIG. 2C is an upper perspective view of an assembly of the container and the clamp.

Referring to FIGS. 2B and 2C, the clamp 16 is a two-piece clamp that includes a first half 28 and a second half 30. Each half 28, 30 includes a semi-cylindrical inner surface that has an inset to correspond to the lid 24 and a plurality of outer surfaces that are planar. Thus, each half 28, 30 may have a cross section with outer surfaces that form half a square, half a rectangle, half a hexagon, half an octagon, or other geometric shapes that have an even number of sides. Furthermore, when the clamp 16 is attached to the container 14 as shown in FIG. 2C, the clamp 16 includes two surfaces on opposing sides that are parallel to one another.

The clamp 16 is formed from polymers or other rigid materials that can withstand the acceleration forces exerted by the vibration device 12. During usage, the first half 28 is placed on a first side of the container 14, in contact with the outer surface thereof, and the second half 30 is placed on a second, opposing side of the container 14, in contact with the outer surface thereof. The clamp 16 may serve at least two purposes. The first purpose is to provide structural reinforcement of the side wall of the container 14 when the container 14 is in the second orientation during the second stage of the mixing, milling, and coating process described in more detail below. The second purpose is to adapt the container 14 to be more easily retained in the vibration device 12 when the container 14 is in the second orientation during the second stage of the mixing, milling, and coating process. The flat outer surfaces of the clamp 16 may be more easily held in the retention apparatus of the vibration device 12 than the cylindrical outer surface of the container 14 itself.

Referring to FIGS. 1, 3A, and 3B, portions of the mixing, milling, and coating process are illustrated. The constituents 18 are placed in the container 14, and the lid 24 is attached to the container 14 (although the container 14 with no lid 24 is shown in the figures). The clamp 16 may optionally be attached to the container 14. In a first stage, the container 14 is positioned in the chamber 22 of the vibration device 12 so that the container 14 is in a first orientation, and the container 14 is retained at opposing ends thereof by the vibration device 12. Typically, the first orientation is that the longitudinal axis 26 of the container 14 is parallel to, or aligned with, the vertical or Z axis, as shown in FIG. 3A. Vibration is applied to the container 14 with the motion also being along the Z axis. The acceleration of the vibration is equal to approximately 100 G. The vibration may be applied to the container 14 for a single period of time or multiple periods of time, with a break or rest between each period of vibrational operation. After the first stage, some constituents 18 may have been milled so that the size of those constituents 18 has been reduced.

In a second stage, the container 14 is positioned in the chamber 22 so that the container 14 is in a second orientation. Typically, the second orientation is that the longitudinal axis 26 of the container 14 is parallel to, or aligned with, the horizontal or XY plane, as shown in FIG. 3B—although the second orientation may be any orientation wherein the longitudinal axis 26 of the container 14 is not parallel to, or aligned with, the vertical or Z axis. The container 14 may be positioned in the second orientation automatically by the container reorientation apparatus within the vibration device 12 or manually by removing the container 14 from the chamber 22, rotating it to the second orientation, and placing it back in the chamber 22. The clamp 16 may be attached to the container 14, if it is not already, to facilitate retention of the container 14 by the vibration device 12. Thus, the vibration device 12 may retain opposing sides of the clamp 16. Vibration is applied to the container 14 with the motion being along the Z axis, as shown in FIG. 3B. The acceleration of the vibration is equal to approximately 25 G. The vibration may be applied to the container 14 for a single period of time or multiple periods of time, with a break or rest between each period of vibrational operation.

Given that the direction of vibrational motion is generally transverse to the longitudinal axis 26 of the container 14, the constituents 18 reflect off of the curved surfaces of the interior of the container 14 more directly and more often. (The more direct interaction of the constituents 18 with the side wall of the container 14 results in the need for the clamp 16 to structurally reinforce the container 14 or for the container 14 to be formed from materials with greater strength or hardness.) This increased reflection may induce a more chaotic path of travel for the constituents 18 and may increase the rotation of each constituent 18 while in motion. The enhanced rotation and different angles of collisions between the constituents 18 leads to improved spherical coating of some constituents 18 onto other constituents 18.

An exemplary process was performed with a first constituent 18 having a size ranging from approximately 30 microns to approximately 40 microns and of relatively greater hardness, a second constituent 18 having a size ranging from approximately 5 microns to approximately 6 microns and of relatively greater softness, and a third constituent 18 having a size ranging from approximately 1 microns to approximately 2 microns and of relatively greater softness. The constituents 18 had the first stage of the mixing, milling, and coating process applied to reduce the size of the second and third constituents 18. The second stage of the mixing, milling, and coating process was applied to complete the coating of the second and third constituents 18 onto the first constituent 18. Prior art techniques for mixing, milling, and coating the same type of constituents 18 may take on the order of hundreds of hours to complete. The mixing, milling, and coating process of the current invention takes on the order of ten hours or less to complete.

The process of the current invention is scalable. The size of the constituents 18 may be varied. The size of the container 14 may be varied so that processing of larger volumes of constituents 18 may be implemented. In addition, at least the second stage of the process may be repeated, with new constituents 18 added each time the second stage is repeated in order to provide multiple coatings of certain constituents 18.

Figure 4:
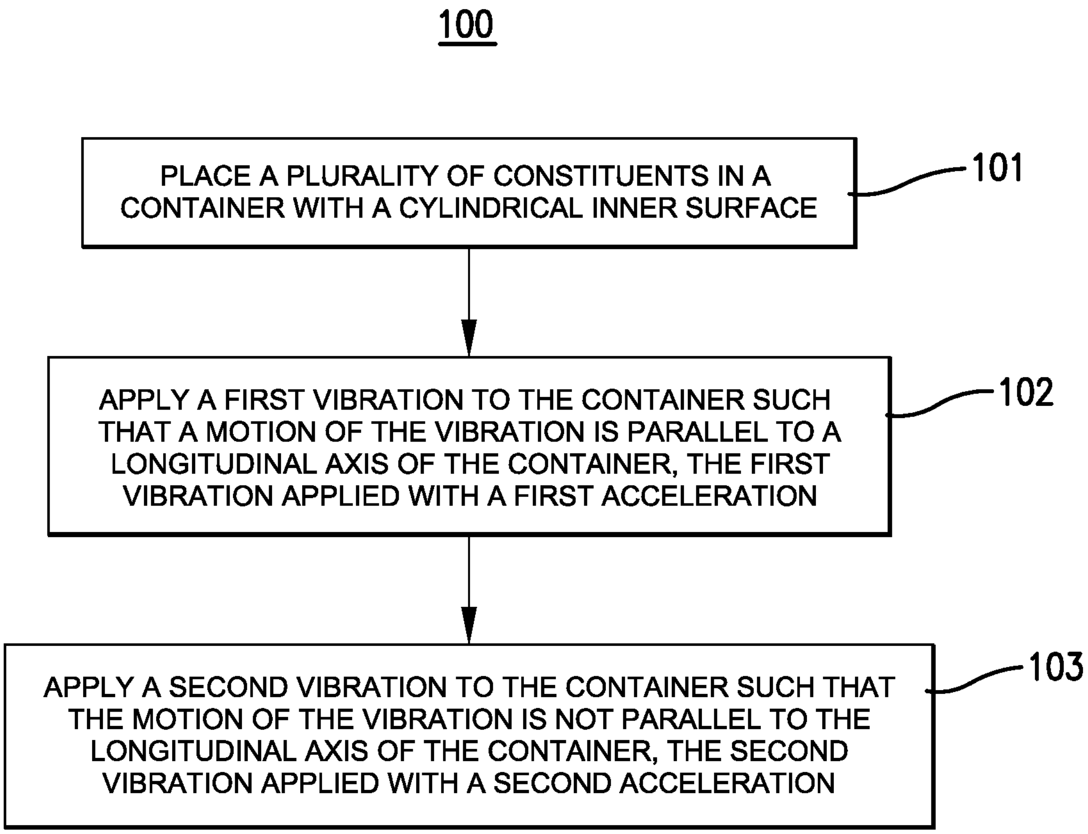
FIG. 4 is a listing of at least a portion of the steps of a method of mixing, milling, and coating a plurality of constituents.

FIG. 4 depicts a listing of at least a portion of the steps of an exemplary method 100 for mixing, milling, and coating. The steps may be performed in the order shown in FIG. 4, or they may be performed in a different order. Furthermore, some steps may be performed concurrently as opposed to sequentially. In addition, some steps may be optional or may not be performed.

Referring to step 101, a plurality of constituents 18 are placed in a container 14. Each constituent 18 is a small object or particle and may have a regular shape, such as a spherical shape, a cubic shape, or a hexagonal shape, or an irregular shape. The constituents 18 may have a size ranging from a few microns to a few millimeters. Furthermore, the term “constituent” may refer to a group of objects or particles that have a common property, such as those that are formed from the same material or have roughly the same size. The container 14 has a cylindrical inner surface. In some embodiments, such as those shown in the figures, the container 14 may have a cylindrical outer surface formed by a generally cylindrical circumferential side wall. In other embodiments, the container 14 may have a generally cubic or rectangular box outer surface. In all embodiments, the container 14 has a longitudinal axis 26. The container 14 also includes a lid 24. The lid 24 is attached to the container 14 after the constituents 18 are inside the container 14.

Referring to step 102, a first vibration is applied to the container 14 such that a motion of the vibration is parallel to the longitudinal axis 26 of the container 14. The vibration may be applied by a vibration device 12, which includes a housing 20 that encloses a chamber 22. The container 14 is positioned in the chamber 22 of the vibration device 12 so that the container 14 is in a first orientation. Typically, the first orientation is that the longitudinal axis 26 of the container 14 is parallel to, or aligned with, the vertical or Z axis, as shown in FIG. 3A. Vibration is applied to the container 14 with the motion also being along the Z axis. The acceleration of the vibration is equal to approximately 100 G. The vibration may be applied to the container 14 for a single period of time or multiple periods of time, with a break or rest between each period of vibrational operation.

Referring to step 103, a second vibration is applied to the container 14 such that a motion of the vibration is not parallel to the longitudinal axis 26 of the container 14. In step 103, the container 14 is positioned in the chamber 22 so that the container 14 is in a second orientation. Typically, the second orientation is that the longitudinal axis 26 of the container 14 is parallel to, or aligned with, the horizontal or XY plane, as shown in FIG. 3B—although the second orientation may be any orientation wherein the longitudinal axis 26 of the container 14 is not parallel to, or aligned with, the vertical or Z axis. The container 14 may be positioned in the second orientation automatically by the container reorientation apparatus within the vibration device 12 or manually by removing the container 14 from the chamber 22, rotating it to the second orientation, and placing it back in the chamber 22. The clamp 16 may be attached to the container 14, if it is not already, to facilitate retention of the container 14 by the vibration device 12. Vibration is applied to the container 14 with the motion being along the Z axis, as shown in FIG. 3B. The acceleration of the vibration is equal to approximately 25 G. The vibration may be applied to the container 14 for a single period of time or multiple periods of time, with a break or rest between each period of vibrational operation.

ADDITIONAL CONSIDERATIONS

Throughout this specification, references to “one embodiment”, “an embodiment”, or “embodiments” mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A method for mixing, milling, and coating a plurality of constituents, the method comprising:

placing the constituents in a container that includes a cylindrical inner surface;

applying a first vibration to the container such that a motion of the first vibration is parallel to, or aligned with, a longitudinal axis of the container, the first vibration being applied with a first acceleration having a first value; and applying a second vibration to the container, sequentially after applying the first vibration, such that the motion of the second vibration is not parallel to, or aligned with, the longitudinal axis of the container, the second vibration being applied with a second acceleration having a second value, wherein the first acceleration value is greater than the second acceleration value.

2. The method of claim 1, wherein the first acceleration value is approximately 100 G, and the second acceleration value is approximately 25 G.

3. The method of claim 1, further comprising the step of attaching a clamp to an outer surface of the container so that the clamp is attached while the second vibration is applied, the clamp including two outer surfaces on opposing sides that are parallel to one another.

4. The method of claim 1, wherein the first vibration is applied when the container is in a first orientation, and the second vibration is applied when the container is in a second orientation that is different from the first orientation.

5. The method of claim 4, wherein the first orientation includes having the longitudinal axis of the container roughly parallel to a vertical axis.

6. The method of claim 4, wherein the second orientation includes having the longitudinal axis of the container roughly parallel to a horizontal axis.

7. A method for mixing, milling, and coating a plurality of constituents, the method comprising:

placing the constituents in a container that includes a cylindrical inner surface;

orienting the container such that a longitudinal axis of the container is parallel to, or aligned with, a vertical axis;

applying a first vibration to the container such that a motion of the first vibration is parallel to, or aligned with, the longitudinal axis of the container, the first vibration being applied with a first acceleration having a first value;

rotating the container such that the longitudinal axis is parallel to, or aligned with, a horizontal axis; and applying a second vibration to the container such that the motion of the second vibration is transverse to the longitudinal axis of the container, the second vibration being applied with a second acceleration having a second value, wherein the first acceleration value is greater than the second acceleration value.

8. The method of claim 7, wherein the first acceleration value is approximately 100 G, and the second acceleration value is approximately 25 G.

9. The method of claim 7, further comprising the step of attaching a clamp to an outer surface of the container so that the clamp is attached while the second vibration is applied, the clamp including two outer surfaces on opposing sides that are parallel to one another.

10. The method of claim 7, wherein the first vibration and the second vibration are each applied by a vibration device that applies back and forth reciprocating motion along a single axis.

* * * * *